United States Patent [19]

DeRomano

[11] 4,094,466
[45] June 13, 1978

[54] IRRIGATION APPARATUS

[76] Inventor: Oscar DeRomano, Rue du Stade, Fontvieille, Monaco

[21] Appl. No.: 762,138

[22] Filed: Jan. 24, 1977

Related U.S. Application Data

[63] Continuation of Ser. No. 649,339, Jan. 15, 1976, abandoned.

[51] Int. Cl.² .............................................. B05B 15/00
[52] U.S. Cl. ...................................... 239/145; 61/13; 239/542
[58] Field of Search ...................... 239/145, 542, 547; 61/11, 12, 13

[56] References Cited

U.S. PATENT DOCUMENTS

| | | | |
|---|---|---|---|
| 2,052,020 | 8/1936 | Black | 239/145 X |
| 2,653,449 | 9/1953 | Stauch | 239/542 X |
| 3,279,773 | 10/1966 | Schwartz | 261/122 |
| 3,583,635 | 6/1971 | Lemelson | 239/145 |
| 3,840,182 | 10/1974 | Geffroy | 239/145 |
| 3,874,591 | 4/1975 | Werner | 239/542 X |
| 3,880,965 | 4/1975 | Dudis et al. | 239/145 X |
| 3,901,448 | 8/1975 | Babin | 239/145 |

Primary Examiner—Joseph F. Peters, Jr.
Assistant Examiner—Michael Mar
Attorney, Agent, or Firm—Gregory J. Nelson

[57] ABSTRACT

A device for underground drainage and irrigation of soil. The device includes a porous element which can be engaged about a distribution pipe at a perforation or opening in the pipe. In one form, the porous element comprises an annular flange connecting adjacent pipe sections. In another embodiment, the element can be clipped over an aperture or orifice in the pipe.

1 Claim, 5 Drawing Figures

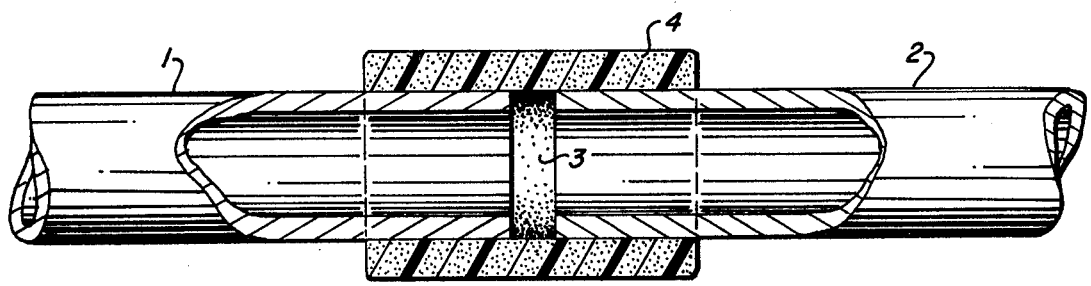
FIG-1
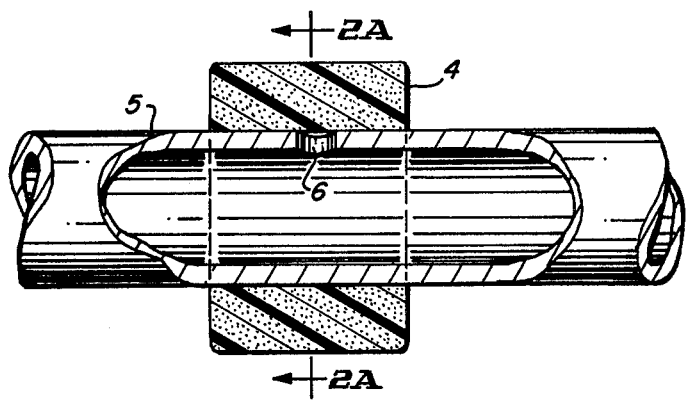 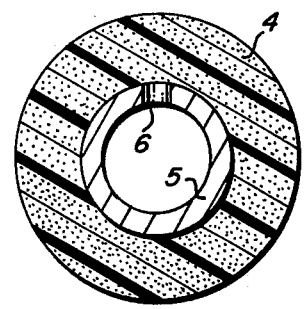
FIG-2    FIG-2A
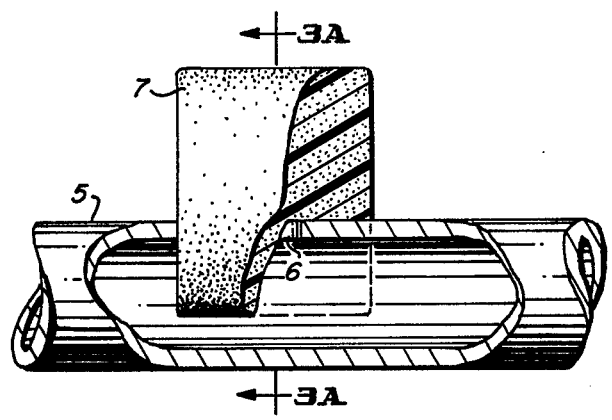 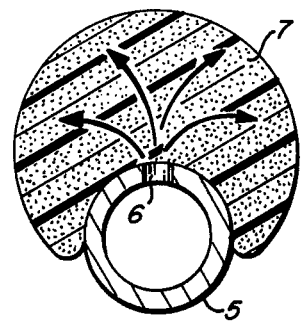
FIG-3    FIG-3A

IRRIGATION APPARATUS

This is a continuation of application Ser. No. 649,339 filed Jan. 15, 1976 now abandoned.

This invention relates to an apparatus for superficial or underground irrigation.

Briefly, the present invention comprises a porous filter element that can be connected to a hydraulic pipe at a suitable opening or aperture. The hydraulic pipe may be a water pipe, pressurized or unpressurized.

The filter apparatus of the present invention is totally different from other irrigation systems utilizing porous pipes and affords advantages not found in prior systems. The invention allows, in addition to irrigation and drainage, predetermined quantities of water to be delivered to selected points.

The apparatus of the present invention offers numerous advantages as contrasted to a perforated pipe embedded in the soil.

The perforations in such a pipe often become clogged or plugged with dirt and debris. The apparatus of the invention provides advantages over completely porous distribution systems permitting the irrigation to be localized and delivered to selected points. The apparatus of the present invention is also more economical since the porous diffusion elements are only provided at necessary points in the system.

Apertures in a pipe distribution system can be provided in two ways in accordance with the present invention. In the first instance, a space may be provided between the ends of two separate, aligned pieces of pipe. The porous filter or diffusion member, in one embodiment, can be in the form of a flange connector joining the two adjacent pipe sections. The individual porous elements are comprised of a quantity of small plastic particles which are sintered to one another in a way to leave interstitial spaces to allow passage of fluid through the element. The sintering may be accomplished by heat, pressure or application of a suitable bonding agent.

In accordance with another embodiment of the present invention, the flow passages or apertures are formed by perforating a pipe at selected locations. The location and size of the perforations are selected according to the desired characteristics of the system. The apertures are then covered by a porous element permitting flow to be dispersed across the aperture and through the element.

The porous elements can either be in the form of an annular member which is engaged or threaded about the pipe or in the form of an element having a semi-cylindrical concavity which can be clipped about the pipe at an aperture.

The following drawing figures represent views of several different embodiments of the present invention for purposes of illustration and not by way of limitation.

FIG. 1 is a sectional view illustrating one form of the invention in which the porous element is a flange connecting adjacent pipe ends;

FIG. 2 is a longitudinal sectional view showing another form of the porous element or diffuser of the present invention;

FIG. 2A is a sectional view taken along lines 2A—2A of FIG. 2;

FIG. 3 is a sectional view illustrating another form of the present invention; and FIG. 3A is a sectional view taken along lines 3A—3A of FIG. 3.

Referring now to FIG. 1, two separate sections of tubular pipe 1 and 2 are coaxially disposed but spaced apart leaving an interval 3 between them. A porous, annular flange 4 is engaged over the ends of the pipes 1 and 2 extending across the space 3 between the pipes. Water flowing through pipes 1 and 2 will be permitted to flow out through the porous element 4.

FIG. 2 shows a cylindrical pipe 5 defining a perforation or aperture 6 over which is placed a porous cylindrical flange 4.

The particular characteristics of the porous elements, such as the size of the individual plastic particles and interstitial spacing, are selected in accordance with the desired flow characteristics. The individual elements 4, after being positioned on the pipes, are secured to the pipe by application of a suitable cement or by frictional engagement. The pipe over which the porous elements are fitted could be provided with one or several perforations at spaced-apart longitudinal or radial locations according to flow requirements. The holes are sized according to the pressure and quantity of water to be delivered to the desired point.

FIGS. 3 and 3A show another form of the present invention in which the porous element 7 does not completely surround the pipe 5 which defines the aperture 6. The porous element 7 has a semi-cylindrical concave section which can be clipped or placed over the aperture 6 on tube 5 without the necessity of slipping it entirely about the pipe. This embodiment is particularly advantageous in that the pipe 5 may be perforated at any suitable location and the element 7 simply clipped in place.

The individual porous elements are comprised of a quantity of small plastic particles, as for example, pellets of polyvinylchloride, sintered by application of heat, pressure or a bonding agent. The sintering leaves interstitial spaces to allow passage of fluid through the element.

It will be obvious to those skilled in the art to make various changes, modifications and alterations to the device of the present invention. To the extent that these changes, modifications and alterations do not depart from the spirit and scope of the appended claims, they are intended to be encompassed therein.

I claim:

1. An irrigation apparatus for use with a cylindrical distribution pipe having apertures at spaced locations along the pipe, said apparatus comprising: a porous structurally rigid, solid body formed by sintering a quantity of plastic particles leaving interstitial spaces therebetween and thereby permitting flow of water therethrough, said body having a generally cylindrical shape with a central longitudinal axis adapted to be parallel with the axis of said distribution pipe, the lower portion of said body having a hollow portion extending therethrough with the longitudinal axis thereof parallel to the central axis of said body, said hollow portion having a cross-section which is at least semi-circular and wherein the greatest extent of said hollow portion into said body is at the central axis of said body, said hollow portion forming with said body two longitudinally extending, transversely depending sections which are adapted to conform to the exterior surface of said distribution pipe so that the apparatus can be engaged and retained in a self-supporting position by clipping the body in place about the distribution pipe over at least one of said apertures to distribute and diffuse a flow of fluid from said aperture into the area surrounding the apparatus at low pressure and low flow rates.

* * * * *